(12) United States Patent
Zelman

(10) Patent No.: US 6,598,268 B1
(45) Date of Patent: Jul. 29, 2003

(54) CLIP WITH RETAINING SOCKET FOR STOWING AUXILIARY EYEGLASSES

(76) Inventor: Gary Martin Zelman, 997 Flower Glen St., Simi Valley, CA (US) 93065

( * ) Notice: Subject to any disclaimer, the term of this patent is extended or adjusted under 35 U.S.C. 154(b) by 0 days.

(21) Appl. No.: 10/020,092

(22) Filed: Dec. 11, 2001

(51) Int. Cl.7 .......................... A44B 21/00; A45F 5/02; G02C 9/04
(52) U.S. Cl. .................. 24/3.3; 24/3.1; 24/13; 351/57; 351/112
(58) Field of Search .................. 24/3.3, 3.1, 13; 224/250; 351/57, 112; 248/231.51, 902; D3/219

(56) References Cited

U.S. PATENT DOCUMENTS

| | | | | |
|---|---|---|---|---|
| 2,307,808 A | * | 1/1943 | Segal | 24/3.3 |
| 3,428,286 A | * | 2/1969 | Pesco | 248/231.51 |
| 4,349,246 A | * | 9/1982 | Binner | 351/57 |
| 4,662,039 A | * | 5/1987 | Richardson | 24/489 |
| 4,894,887 A | * | 1/1990 | Ward, II | 24/3.3 |
| 5,407,642 A | * | 4/1995 | Lord | 422/122 |
| 5,842,613 A | * | 12/1998 | White | 224/250 |
| 5,860,191 A | * | 1/1999 | Sieger | 24/3.3 |
| 5,941,487 A | * | 8/1999 | Keely | 248/351.51 |
| 6,139,142 A | * | 10/2000 | Zelman | 351/57 |
| 6,210,003 B1 | * | 4/2001 | Chan | 351/112 |

* cited by examiner

*Primary Examiner*—Victor Sakran
(74) *Attorney, Agent, or Firm*—David O'Reilly

(57) ABSTRACT

A clip for stowing auxiliary eyeglasses comprised of a pair of clip bodies forming a jaw with a cylindrical socket formed on exterior surface of one of the bodies. The cylindrical socket is constructed to receive a cylinder held in place by a circumferential ridge engaging a circumferential groove in the cylinder that allows the cylinder to freely rotate in the socket. The cylinder also includes a rectangular slot having detents on either end for receiving a cylindrical end of appendages on auxiliary eyeglasses. The entire clip is simple in construction and easy to use and will securely and quickly stow away auxiliary eyeglasses when not in use.

16 Claims, 2 Drawing Sheets

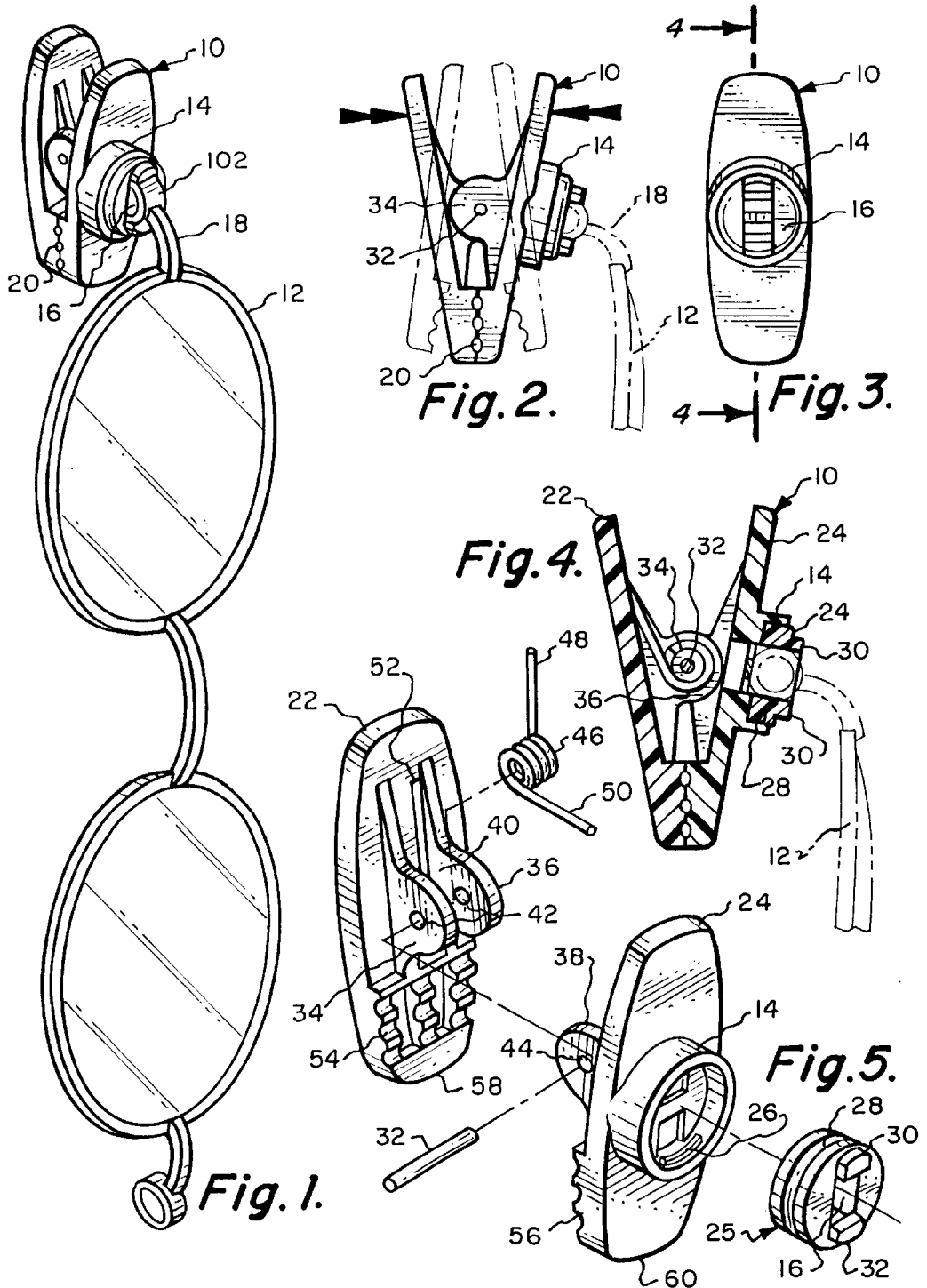

CLIP WITH RETAINING SOCKET FOR STOWING AUXILIARY EYEGLASSES

BACKGROUND OF THE INVENTION

1. Field of the Invention

This invention relates to clips for stowing items and more particularly relates to a clip for conveniently storing auxiliary eyeglasses.

2. Background Information

Auxiliary eyeglasses are eyeglasses that can be mounted on conventional eyeglasses. They are usually sunglasses that are secured by some means to the frame of the conventional eyeglasses. A popular method of attaching the auxiliary eyeglasses is by magnets in appendages or extensions on each side of the auxiliary eyeglass frame. Such an arrangement is shown on or taught in U.S. Pat. No. 6,139,142.

However, when the auxiliary eyeglasses are not being used, there is the problem of where to store them. It is not always convenient to carry an eyeglass case to be used for storage. They could be stored in a pocket but sometimes there are no pockets to use or they contain other items. Also, a pocket may not be the best place to store them because they could fall out or perhaps be damaged slipping them in and out of a pocket. For example, the lens could get scratched by other items in the pocket or in some pockets they might get crushed.

There are several patents for devices to mount.and store eyeglasses which are not entirely suitable for auxiliary eyeglasses. One such device is disclosed in U.S. Pat. No. 5,842,613 of White issued Dec. 1, 1998. This device has a ring on a clip for receiving the temple of eyeglasses. The temple when folded over is slipped through the ring to loosely hang the eyeglasses.

Similar devices are also shown in U.S. Pat. No. 5,860,191 of Sieger issued Jan. 19, 1999 and U.S. Pat. No. 5,941,487 of Keely issued Aug. 24, 1999. These devices would not be suitable for auxiliary eyeglasses as the latter has no temple pieces.

An eyeglass clip device is also disclosed in U.S. Pat. No. 6,210,003 of Chan issued Apr. 3, 2001. This device includes a cover and a base and rubber cushions for supporting eyeglasses by the bridge and includes a spring clip to mount the device on a belt. It is complicated in design and construction would not be necessarily convenient to use.

It is one object of the present invention to provide a clip for mounting and storing auxiliary eyeglasses that is very convenient to use.

Another object of the present invention is to provide a clothing clip having a socket for quickly receiving and storing auxiliary eyeglasses.

Still another object of the invention is to provide a clothing clip having a socket with a rotatable cylinder for storing auxiliary eyeglasses so the clip can be attached in any convenient position.

Yet another object of the present invention is to provide a clothing clip having a rotatable cylinder in a socket with a slot for receiving and retaining an end of an appendage or extension on either side of the auxiliary glasses.

Still another object of the present invention is to provide a clothing clip with a rotatable cylinder having a slot and detents in said slot. An end of an appendage or extension on said auxiliary eyeglasses quickly and conveniently snaps into said slot and is retained by said detents.

BRIEF DESCRIPTION OF THE INVENTION

The purpose of the present invention is to provide a clip for temporarily stowing auxiliary eyeglasses when not being worn.

A clip for stowing auxiliary eyeglasses is comprised of first and second bodies or members having jaws formed by a knurled or undercut surfaces at one end of each member. The first and second members are joined together by a pin through boss in one member that mates with flanges on the other member so that the knurled or undercut surfaces mate to form jaws. The jaws allow the clip to be conveniently mounted on clothing such as a pocket or any convenient edge. A coil spring mounted between the first and second members holds the jaws in a closed position so they can be clamped on an appropriate surface.

Auxiliary eyeglasses are releasably held on the clip by a slot in a cylinder in a cylindrical socket formed on an exterior surface of one of the clip members. The cylinder or barrel is mounted in the socket by a circumferential groove. One or more ridges on an interior surface of the cylindrical socket engage and snap into the circumferential groove in the cylinder or barrel. The ridge engages the groove and allows the cylinder to freely rotate in the cylindrical socket. This permits the clip to be fastened, preferably somewhere on a person's clothing, etc., with the clip in any position.

A slot is formed in the cylinder for receiving the end of one of the appendages on either side of the auxiliary glasses. Auxiliary glasses with magnets have a cylindrical end for receiving a magnet. Detents are provided in the slot for receiving and securely holding the cylindrical end of an appendage on the clip.

To use the device, the auxiliary eyeglasses are removed and a cylindrical end is pressed into the slot in the cylinder with the index or another finger on the clip until it snaps into place. The clip can then be fastened any convenient place such as on clothing. To remove the auxiliary eyeglasses they are pulled outward with a slight upward twist to detach the end of the appendages from the slot on the clip. The clip may be left in place for reuse as needed.

In an optional embodiment, the clip and socket are configured to hold auxiliary glasses of slightly different design. For example, the auxiliary glasses may, in some cases, have appendages that angle rearward along the temples and then angle downward at right angles to the temple. The socket on the clip for this type of construction is at substantially right angles to the surface of the clip and has the same cylinder or barrel. As before, the cylinder has a slot with detents for receiving one end of the magnet supporting appendages. As described previously, the cylinder is free to rotate to allow the clip to be fastened in any position. Other variations are possible for various designs of appendages on auxiliary eyeglasses.

The above and other objects, advantages, and novel features of the invention will be more fully understood from the following detailed description and the accompanying drawings, in which:

BRIEF DESCRIPTION OF THE DRAWINGS

FIG. 1 is an elevational view with auxiliary eyeglasses being securely held in a socket on a clip.

FIG. 2 is a partial sectional view illustrating the operation of the clip to mount and securely hold auxiliary eyeglasses.

FIG. 3 is a front elevation of the clip.

FIG. 4 is a sectional view taken at 4—4 of FIG. 3.

FIG. 5 is an exploded view illustrating the assembly of the parts forming the auxiliary eyeglass supporting clip.

DETAILED DESCRIPTION OF THE INVENTION

Figure 6:
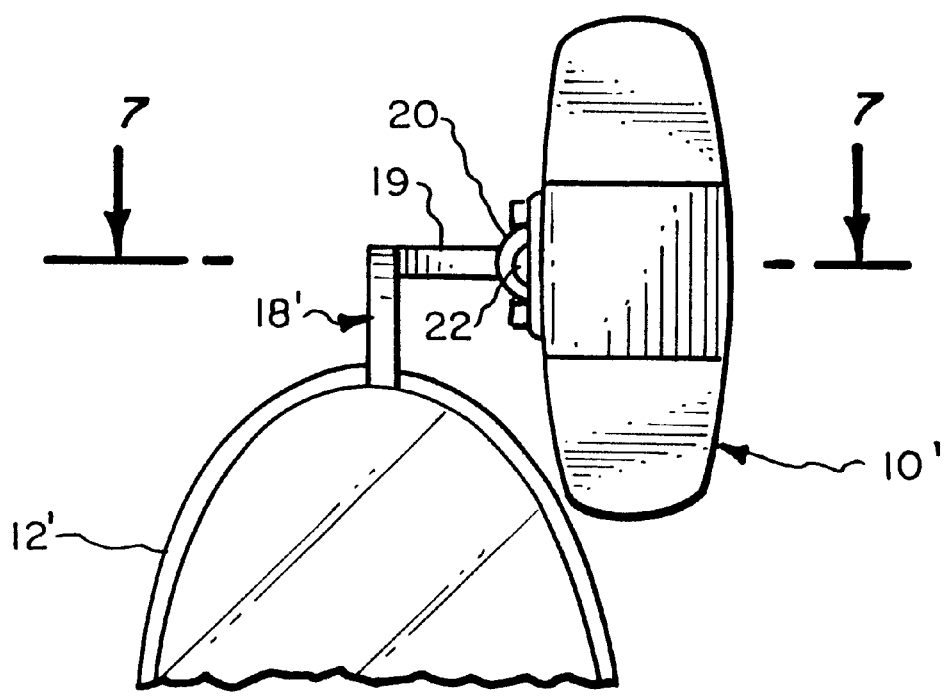
FIG. 6 is an elevational view of an alternate embodiment of the clip shown in FIGS. 1 through 5.

A clip 10 for conveniently stowing and securely holding auxiliary eyeglasses 12 is illustrated in FIG. 1. Clip 10 is provided with a socket 14 having a slot 16 for receiving the end of an appendage 18 on auxiliary eyeglasses 12. With auxiliary eyeglasses 12 securely held in socket 14, clip 10 is squeezed as illustrated by the arrows in FIG. 2 to open jaws 20 for fastening the clip to any convenient location on a user's clothing as will be described in greater detail hereinafter.

The construction of the clip for stowing auxiliary eyeglasses is illustrated in FIGS. 3 through 5. Clip 10 is comprised of a first clamp body or member 22 and a second clamp body or member 24. Cylindrical socket 14 is formed on the exterior surface of second clamping body 24. A cylinder or barrel 24 fits into cylindrical socket 14 and is held in place by ridges 26 (FIG. 5) on opposite sides of cylindrical socket 14. Cylinder 24 includes a slot 16 having detents 30 and 32 at either end to hold auxiliary eyeglasses in cylinder 24. Cylindrical barrel 24 has a circumferential groove 28 that is engaged by ridges 26 inside cylindrical socket 14. This allows cylinder or barrel 24 to freely rotate in cylindrical socket 14. This permits clip 10 to be clamped to an article of clothing in any position allowing auxiliary glasses 12 to hand freely.

First and second clamping bodies 22 and 24 have flanges 34 and 36 and a boss 38 that abuts flange 34 and is held in place by pin 32 passing through aperture 44, boss 38 and apertures 42 in flanges 34 and 36. Spring 46 fits between flanges 34 and 36 and has extensions 48 and 50 at each end that engage channels (only one is shown) 52 on the inside surface of each clip body 22 and 24. Spring 46 holds jaws 20 in a closed position for clipping to an article of clothing. Preferably jaws 20 are formed by knurled or undercut surfaces 54 and 56 on the clamping ends 58 and 60 of clip bodies 22 and 24.

After assembling as shown in FIG. 5, clip 10 can be used to store auxiliary glasses 12 as illustrated in FIG. 1. To stow glasses on clip 10, cylindrical end 62 on appendage 18 of auxiliary eyeglasses 10 is inserted into slot 16 in cylinder or barrel 24. Using the index or another finger and pressing lightly, cylindrical end 62 will snap into place over detents 30 and 32 in slot 16. Thus, auxiliary glasses 12 are securely mounted on clip 10 which can now be clipped at some convenient location on a user's clothing by squeezing clip 10 as indicated by the arrows in FIG. 2 to open jaws 20. The clip 10 can be fastened to clothing first to receive auxiliary eyeglasses 12 as described above or the auxiliary eyeglasses can be stowed on the clip before it is fastened to clothing.

To remove the auxiliary glasses from the clip, the user simply lifts the frame of auxiliary glasses 12 to withdraw the glasses by a slight tug on the end of appendage 18 allowing it to slip out of detents 30 and 32 in slot 16.

Figure 7:
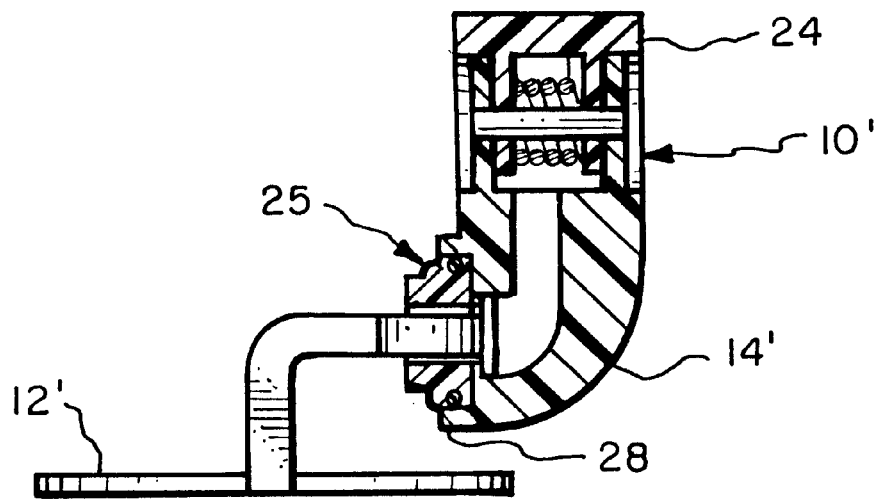
FIG. 7 is a sectional view of the alternate embodiment taken at 7—7 of FIG. 6.

An alternate embodiment is illustrated in FIGS. 6 and 7 to accommodate alternate designs of auxiliary glasses 12'. Some auxiliary glasses have an appendage 18' that has a right angled, downward extension 19 having a cylindrical end 20 holding a magnet 22. For this design, clip 10' has a socket 14' formed at a right angle on the surface of second clip body 24' and has the same cylinder 5 held in place in socket 14' by ridges (not shown) engaging circumferential groove 28 as in the previous embodiment. In each case, cylinder or barrel 25 can freely rotate in socket 14 or socket 14' allowing clip 10' to be conveniently fastened anywhere on the user's clothing.

Thus there has been disclosed a novel clip for stowing auxiliary glasses anywhere convenient on a user's clothing. The clip includes a cylindrical socket on one surface of the clip having a rotatable cylinder in the socket held in place by ridges in the socket. The cylinder includes a slot having detents for receiving a cylindrical end of an appendage on auxiliary glasses and securely stowing or holding the glasses in place on the clip. The clip can then be fastened conveniently anywhere on the user's clothing allowing the glasses to hang freely for use at anytime.

Obviously many modifications and variations of the invention are possible in light of the above teachings and it is therefore, to be understood, that the full scope of the invention is not limited to the details disclosed herein, but only by the claims appended hereto, and may be practiced otherwise and as specifically described.

What is claimed is:

1. A clip for stowing auxiliary eyeglasses when not in use comprising;
    a first body having a clamping jaw;
    a second body having a clamping jaw;
    a spring mounted between said first body and second body for holding said jaws in an opposing closed position;
    a socket on one of said first or second bodies;
    a receptacle in said socket for releasably receiving and holding an end of an extension of said auxiliary sunglasses;
    whereby said auxiliary eyeglasses can be stowed away on said clip.

2. The clip according to claim 1 in which said socket comprises; a cylindrical socket formed on a surface of one of said first or second bodies.

3. The clip according to claim 2 in which said receptacle comprises a cylinder mounted in said cylindrical socket.

4. The clip according to claim 3 in which said cylinder is rotatably mounted in said cylindrical socket.

5. The clip according to claim 4 in which said cylinder has a circumferential groove; and said cylindrical socket has at least one ridge on an inside surface of said cylindrical socket engaging said circumferential groove in said cylinder.

6. The clip according to claim 5 in which said at least one ridge comprises a pair of ridges on opposite sides of said inside surface of said cylindrical socket.

7. The clip according to claim 6 in which said cylinder has a slot for receiving an end of an extension of said auxiliary eyeglasses and a retainer for retaining said end of said auxiliary eyeglasses in said slot.

8. The clip according to claim 7 in which said slot is a rectangular slot.

9. The clip according to claim 7 in which said retainer comprises a pair of detents at opposite ends of said slot for receiving and retaining said end of said auxiliary eyeglass extension.

10. A clip for stowing auxiliary eyeglasses when not in use comprising;
    a first body having a clamping jaw;
    a second body having a clamping jaw;
    a spring mounted between said first body and second body for holding said jaws in an opposing closed position;
    a cylindrical socket on one of said first or second bodies;
    a cylindrical receptacle in said socket for releasably receiving and holding an end of an extension of said auxiliary sunglasses;
    whereby said auxiliary eyeglasses can be stowed away on said clip.

11. The clip according to claim 10 in which said cylinder is rotatably mounted in said cylindrical socket.

12. The clip according to claim 11 in which said cylinder has a circumferential groove; and said cylindrical socket has at least one ridge on an inside surface of said cylindrical socket engaging said circumferential groove in said cylinder.

13. The clip according to claim 12 in which said at least one ridge comprises a pair of ridges on opposite sides of said inside surface of said cylindrical socket.

14. The clip according to claim 13 in which said cylinder has a slot for receiving an end of an extension of said auxiliary eyeglasses and a retainer for retaining said end of said auxiliary eyeglasses in said slot.

15. The clip according to claim 14 in which said slot is a rectangular slot.

16. The clip according to claim 14 in which said retainer comprises a pair of detents at opposite ends of said slot for receiving and retaining said end of said auxiliary eyeglass extension.

* * * * *